United States Patent
Kesselman

(10) Patent No.: US 7,256,357 B1
(45) Date of Patent: Aug. 14, 2007

(54) POSTAL SCALE WITH EXTENDABLE INPUT/OUTPUT UNIT

(76) Inventor: Joshua D. Kesselman, 2515 S.W. Marine Drive, Vancouver, BC (CA) V6P 6C3

( * ) Notice: Subject to any disclaimer, the term of this patent is extended or adjusted under 35 U.S.C. 154(b) by 266 days.

(21) Appl. No.: 10/976,337

(22) Filed: Oct. 28, 2004

Related U.S. Application Data

(60) Provisional application No. 60/515,531, filed on Oct. 29, 2003.

(51) Int. Cl.
*G01G 19/40* (2006.01)

(52) U.S. Cl. .................................................. 177/25.15

(58) Field of Classification Search ............. 177/25.15, 177/25.11–25.13, 238–243
See application file for complete search history.

(56) References Cited

U.S. PATENT DOCUMENTS

| | | | |
|---|---|---|---|
| 2,805,055 A | 9/1957 | Swanson | |
| 3,838,744 A | 10/1974 | Tanji et al. | |
| 4,084,242 A * | 4/1978 | Conti | 705/407 |
| 4,601,355 A * | 7/1986 | Takahashi | 177/2 |
| 4,632,199 A | 12/1986 | Ober et al. | |
| 4,676,327 A * | 6/1987 | Luechinger | 177/126 |
| 4,700,792 A * | 10/1987 | Tajima et al. | 177/178 |
| 4,782,904 A * | 11/1988 | Brock | 177/185 |
| 4,979,579 A | 12/1990 | Dardat et al. | |
| 5,203,419 A | 4/1993 | Douglas | |
| D358,590 S | 5/1995 | Weirman | |
| 6,013,878 A | 1/2000 | Schwartz et al. | |
| 6,043,438 A | 3/2000 | Helberg | |
| 6,426,471 B1 * | 7/2002 | Gubitose | 177/25.15 |
| 6,516,221 B1 * | 2/2003 | Hirouchi et al. | 600/547 |
| 6,516,222 B2 * | 2/2003 | Fukuda | 600/547 |
| 6,531,665 B2 * | 3/2003 | Gietenbruch et al. | 177/126 |
| 6,590,166 B2 * | 7/2003 | Yoshida | 177/25.13 |
| D503,899 S * | 4/2005 | Yamada et al. | D10/97 |
| 6,891,113 B2 * | 5/2005 | Fringeli et al. | 177/238 |
| 6,960,730 B2 * | 11/2005 | Lawler et al. | 177/25.15 |
| 7,060,914 B2 * | 6/2006 | Suzuki | 177/238 |

* cited by examiner

*Primary Examiner*—Randy W. Gibson
*Assistant Examiner*—Sean Kayes
(74) *Attorney, Agent, or Firm*—Christine O. McLeod; Beusse Wolter Sanks Mora & Maire

(57) ABSTRACT

A postal type scale, such as an electronic scale, capable of weighing a plurality of different size packages is provided. The scale includes a weighing mechanism in its base, a platform for supporting a package thereon in a weighing relationship, and an extendable input/output unit (e.g., weight display and keypad) removeably attached to the scale and extendable therefrom. The input/output unit includes a weight display, such as an LCD display, and an input device such as a keypad or touchscreen or the like. When attached to the scale, weight display and keypad form a compact unitary design. When extended away from the scale, the display and keypad may be located at a position remote from the scale on any plane.

8 Claims, 1 Drawing Sheet

POSTAL SCALE WITH EXTENDABLE INPUT/OUTPUT UNIT

CROSS-REFERENCE TO A RELATED APPLICATION

This application claims the benefit of U.S. Provisional Patent Application Ser. No. 60/515,531 filed Oct. 29, 2003, incorporated herein by reference.

FIELD OF INVENTION

The present invention is directed to postal scales. More specifically, the present invention is directed to a postal scale of unitary design having an extendable input/output unit.

BACKGROUND OF INVENTION

Postal scales are well known in the art as are portable weighing scales which can be moved from place to place or left on a counter or other surface at a particular location. These postage scales are typically equipped with means of weighing packages including letters and parcels, and capable of combining the weight and the shipping rate information stored therein to determine the postage and other charges for shipment of the packages.

Many of the scales are also equipped with means of displaying the weight of a package, along with the postage and other shipping charges during the weighing process. For aesthetic reasons, the display screens of such scales are compact and relatively small. As such, the amount of information displayed on one such screen is extremely limited. Moreover, in use, when a large package is weighed, the display and keypad may be visually blocked and inaccessible if the package has a dimension larger in size than the position of the display and keypad. Such displays are typically fixed and non-adjustable. Such displays also present problems when, for example, there is insufficient light or when there is a glare present on the display screen due to overhead lights or sunlight. In addition, for those fixed displays which employ liquid crystal display (LCD) technology, they normally afford an extremely limited viewing angular range, outside which the display contrast deteriorates substantially. Since a user cannot adjust a fixed display to improve the lighting condition or to increase the viewing range, the user under these unfavorable conditions tends to be inefficient and susceptible to eye strain.

U.S. Pat. No. 4,979,579 discloses a portable weighing device, namely an electronic balance, in which the horizontal display pivots about the weighing area and telescopes merely to adapt to the contour of the weighing area. However, the display is not longitudinally extendable so as to be able to be viewed from above irrespective of the size of the package placed on the scale.

Other scales are known in the art, including U.S. Pat. Nos. 6,043,438, 6,013,878, 5,203,419, 4,979,579, 4,632,199, 3,838,744, 2,805,055, and D358590. All patents listed herein are incorporated herein by reference in their entirety.

Thus, none of the prior art portable scales known to applicant is capable of providing a compact postal type scale of unitary design capable of weighing a plurality of different size or dimension packages in which the display and keypad (input and output unit) are selectively extendable from the scale so as to be visible and accessible no matter what the size of the package placed on the scale throughout a given size range, while also being retractable into a compact unitary rest position with the scale for normal size packages. These disadvantages of the prior art are overcome by the present invention.

SUMMARY OF INVENTION

In accordance with the present invention, a postal type scale, such as an electronic scale, capable of weighing a plurality of different size packages is provided. The scale includes a weighing mechanism in its base, a platform for supporting a package thereon in a weighing relationship, and an extendable input/output unit (e.g., weight display and keypad) removeably attached to the scale and extendable therefrom. The input/output unit includes a weight display, such as an LCD display, and an input device such as a keypad or touchscreen or the like. When attached to the scale, weight display and keypad form a compact unitary design. When extended away from the scale, the display and keypad may be located at a position remote from the scale on any plane. The weight display and keypad is variably extendable to a plurality of different positions within a predetermined range based on the range of the cord for enabling the weight display and keypad to be read irrespective of the size of the package set on the weighing platform.

Specifically, there is provided a postal type scale capable of weighing a plurality of different size packages, the scale comprising a weighing mechanism; a platform for supporting a package thereon in a weighing relationship with the weighing mechanism, the platform having a periphery and a predetermined size defined by an edge surrounding the periphery of the platform and being capable of supporting the different size packages thereon in the weighing relationship, the platform being capable of supporting a package having a predetermined size greater than the predetermined size of the platform such that the supported package has an edge which extends horizontally beyond the platform edge; a removable faceplate comprising an output and input unit for information associated with the package supported on the platform in the weighing relationship, the faceplate being optionally mounted to the platform in a unitary fashion and removed from the platform along a range of variable horizontal and vertical spaced relationships in any plane; and a retractable cord between the platform and the faceplate providing the range of horizontal and vertical spaced relationships, the cord being retractable into a base of the platform when the faceplate is mounted to the platform, and the cord being extendable therefrom in variable horizontal and vertical directions such that the faceplate may remain extended from the platform a distance determined by a user as the user pulls the faceplate allowing the faceplate and platform to be positioned in distinct locations in a variety of horizontal and vertical planes.

Thus, it is an object of the invention to provide a postage scale which is easy to operate despite the size of the package.

It is a general object of the invention to also provide a postage scale for weighing packages and accurately determining their weight and the requisite postage.

Another object of the invention is to provide automatic display of information including the package weight and the cost of shipment on a display that is easily extendible for convenient viewing when weighing oversized packages.

Another object of the invention is to provide an input/output unit that is easily extendible on any plane for convenient operation when weighing oversized packages.

BRIEF DESCRIPTION OF THE DRAWINGS

Further objects, features and advantages of the invention will become apparent from the following detailed description taken in conjunction with the accompanying figures showing a preferred embodiment of the invention, in which.

Figure 1:
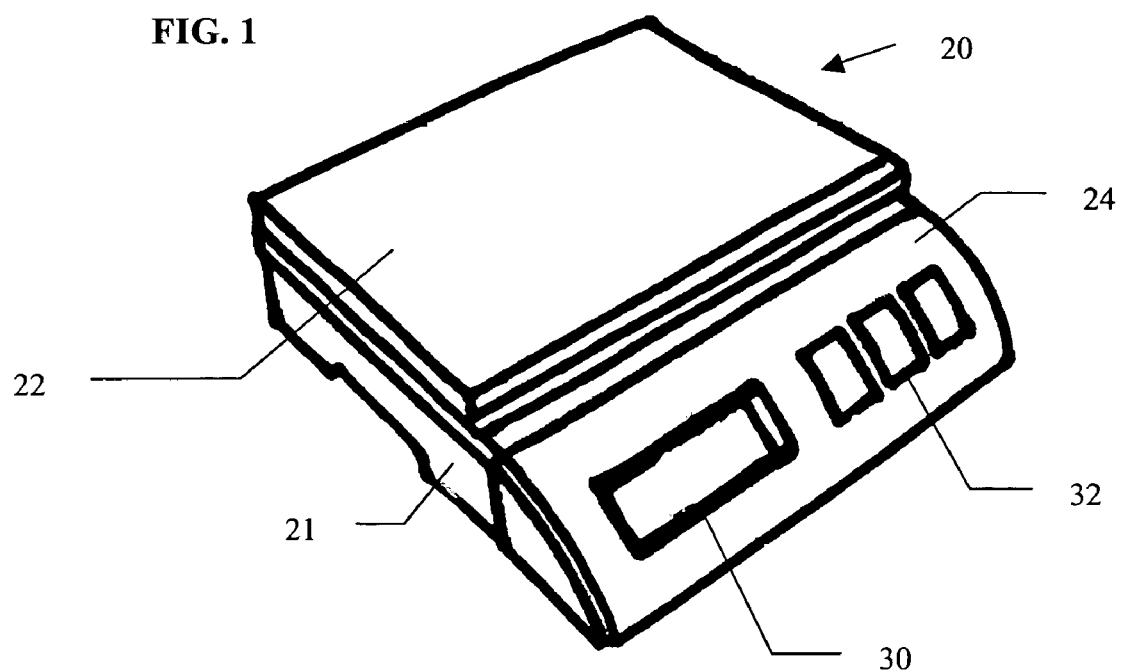
FIG. 1 illustrates an embodiment of postal scale of the present invention with the input/output unit attached to the scale forming a unitary design.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION

Figure 2:
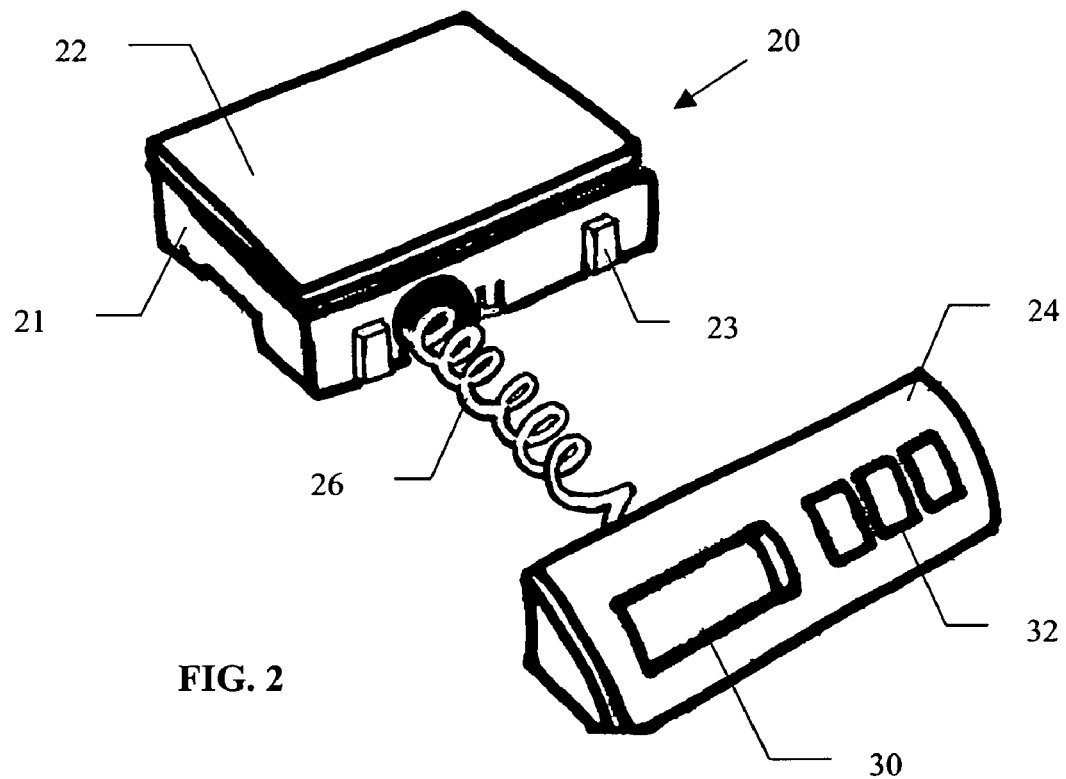
FIG. 2 illustrates an embodiment of postal scale of the present invention with the input/output unit located remotely from the scale itself allowing weighing of large packages without interfering with the input/output unit.

Turning now to FIGS. 1 and 2, wherein like numerals represent like items, an embodiment of the present postal scale 20 is shown. As shown and preferred, the scale 20 includes a weighing platform 22 for supporting a package thereon in a weighing relationship. The scale 20 includes an input/output unit ("I/O unit") 24 along the front of the scale that houses the output functions 30 (e.g., digital display, audio output, and the like) as well as the input functions 32 (e.g., keypad, touchscreen, buttons, sliders, keys, soft-selection keys, and the like). A conventional load cell weighing mechanism [not shown] is located under the weighing platform 22 in the base 21. The load cell may be a digital load cell as known in the art, which, together with the logic circuitry provides a digital readout of the weight of the package on a display 30 which may display the weight in kilograms or pounds. Other digital readouts are also contemplated, including postage amount and the like. As shown and preferred, the display 30 is a LCD readable display comprised of a plurality of LCD indicators.

The scale may further include controllers and/or microprocessors as known in the art to provide advanced functions for the scale, including calculations and the like.

When the I/O unit 24 is attached to the front of the scale 20 ("attached position"), it provides a postal scale of compact unitary design capable of weighing normal size packages. When the I/O unit 24 is removed from its attachment point 28 on the front of the scale ("extended position"), it provides a postal scale with a remote I/O unit 24 capable of weighing oversized packages while still having its I/O unit visible and accessible. Specifically, the weighing platform 22 has a predetermined size defined by its edge surrounding the periphery of the platform 22 and is capable of supporting different size packages thereon. An oversized package is one in which the package is larger than the platform 22 and extends beyond the edge blocking the visibility and accessibility of the I/O unit 24 when the I/O unit 24 is attached to the front of the scale. A normal size package is one in which the I/O unit 24 is visible and accessible when the I/O unit 24 is attached to the front of the scale.

In a preferred embodiment, the I/O unit 24 remains tethered to and in communication with the postal scale 20 with an extendible cord 26. The cord 26 allows the I/O unit 24 to be located remote from the postal scale on any plane. For example, the postal scale may be located on a counter in a mailroom while the I/O unit 24 is located nearby on the counter or on a shelf or keyboard tray. The cord 26 preferably retracts into and is hidden within the base 21 or I/O unit 24 when the I/O unit 24 is attached to the front of the scale. In a preferred embodiment, the elasticity of the cord 26 is such that the I/O unit is not pulled back but can remain extended. For example, a cord with a pull-back strength of less then 1 lb may be appropriate in most circumstances. That would allow the consumer to extend the I/O unit from the base of the scale without it being pulled back. The elasticity may be adjusted as known in the art to overcome the pull-back problem noted above.

The I/O unit 24 is attached to the front of the scale at an attachment point(s) 28 using any means known in the art to provide for removeable attachment thereof. For example, the I/O unit may be attached using a pair of mating male/female connectors, or clips, mounts, or the like. When attached, the I/O unit 24 forms a compact unitary design with the postal scale 20.

By way of example, for a normal type postal scale 20, the platform 22 may be 14 inches by 14 inches and, with the I/O unit 24 protruding about 1.5 inches from the platform edge in the attached position, can easily accommodate letters and normal size packages as large as 15 inches by 15 inches on the 14 inch by 14 inch platform 22. With the I/O unit extended as in FIG. 2, when oversized packages are on the platform 22, the extended I/O unit may still be viewed and accessed.

Even if the package does not obstruct the view of the display, due to poor lighting or location of the scale, the display may not be viewable while attached to the scale. The I/O unit 24 is, therefore, readily detachable and extendible to provide easier access and viewing.

Thus, by utilizing the postal type scale of the present invention, a compact scale of unitary design may be provided in which the I/O unit may be accessed irrespective of the size of the package by removeably extending the I/O unit remote from the scale.

It will become apparent to those skilled in the art that many changes, modifications, variations, and other uses and application of the subject scale are possible and contemplated. All changes, modifications, variations, and other uses and applications which do not depart from the spirit and scope of the invention are deemed to be covered by the invention, which is limited only by the claims.

The invention claimed is:

1. A postal type scale capable of weighing a plurality of different size packages, said scale comprising:
   a weighing mechanism;
   a platform for supporting a package thereon in a weighing relationship with said weighing mechanism, said platform having a periphery and a predetermined size defined by an edge surrounding said periphery of said platform and being capable of supporting said different size packages thereon in said weighing relationship, said platform being capable of receiving a package over said periphery and further being capable of supporting a package having a predetermined size greater than said predetermined size of said platform such that said supported package has an edge which extends horizontally beyond said platform edge;
   a removable faceplate comprising an output and input unit for information associated with said package supported on said platform in said weighing relationship, said faceplate being optionally mounted to said platform and removed from said platform along a range of variable horizontal and vertical spaced relationships in any plane, a retractable cord between said platform and said faceplate providing the range of horizontal and vertical spaced relationships, said cord being retractable into a base of said platform when said faceplate is mounted to said platform, and said cord being extendable therefrom in variable horizontal and vertical directions such that said faceplate may remain extended from said platform a distance determined by a user as said user pulls said faceplate allowing the faceplate and platform to be positioned in distinct locations in a variety of horizontal and vertical planes, and wherein the cord has a predetermined elasticity so that when said faceplate is removed into an extended position, the faceplate will remain extended and not be pulled back;

a pair of mating male and female connectors for mounting said faceplate to said platform in an attached position, wherein the connectors are integrally formed with the base of the platform and a base of the faceplate, when the faceplate and platform are in the attached position the faceplate output and the platform are oriented in different directions.

2. The postal type scale in accordance with claim 1 wherein said range of variable horizontal and vertical spaced relationships between the faceplate and the platform provides a plurality of different vertical and horizontal positions beyond said platform edge within said range of variable horizontal and vertical spaced relationships for enabling said faceplate to be moved from said mounted position to a variety of positions thereof, enabling said faceplate to be operable and not obstructed by said supported package while said faceplate is positioned away from said supported package.

3. The postal type scale in accordance with claim 1 wherein said output and input unit of said faceplate comprises a weight display and keypad.

4. The postal type scale in accordance with claim 3 wherein said weight display comprises a screen and a digital readout.

5. The postal type scale in accordance with claim 3 wherein said keypad comprises
- a weight evaluator for determining the weight of a package to be shipped via a selected service;
- a processing element for determining shipping cost of said package as a function of said weight and for displaying said shipping cost on said screen.

6. The postal type scale in accordance with claim 1 wherein said scale is an electronic scale.

7. The postal type scale in accordance with claim 4 wherein said digital readout comprises an LCD display.

8. The postal type scale in accordance with claim 7 wherein said LCD display comprises a plurality of horizontal LCD indicators.

\* \* \* \* \*